Dec. 2, 1947.   G. A. LYON   2,431,701
TRIM RING FOR VEHICLE WHEELS
Filed April 3, 1946
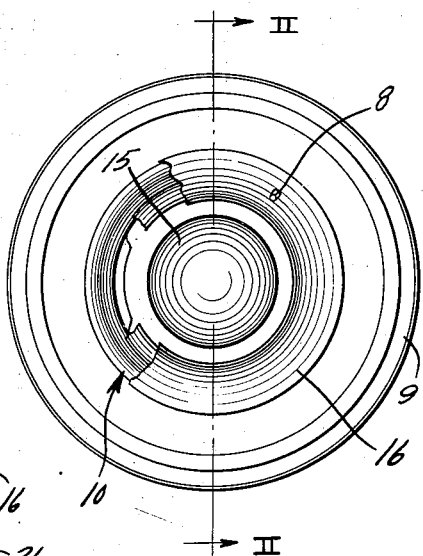
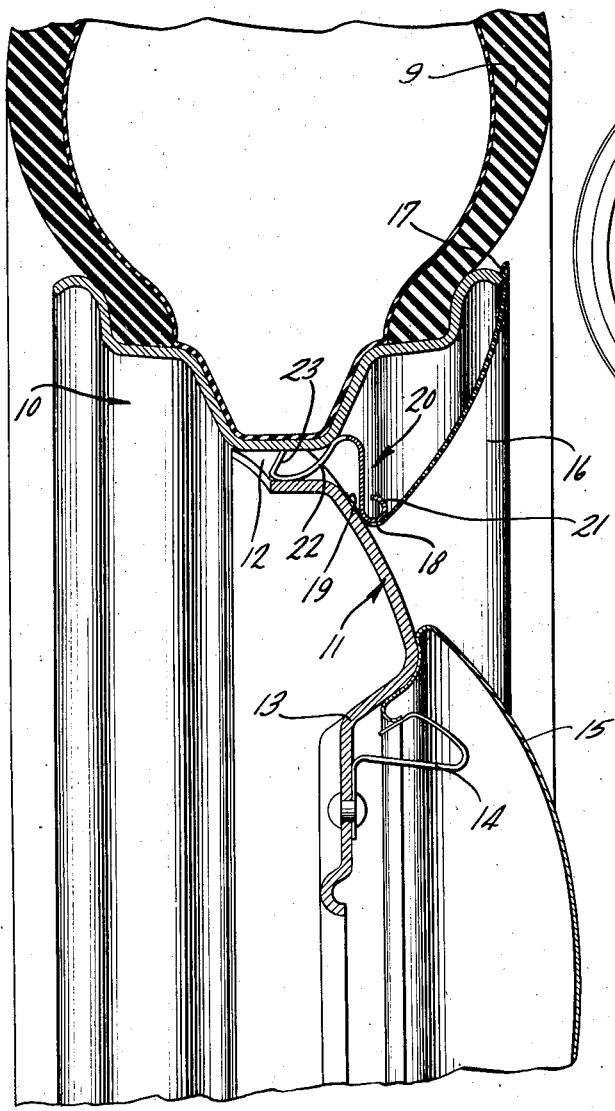
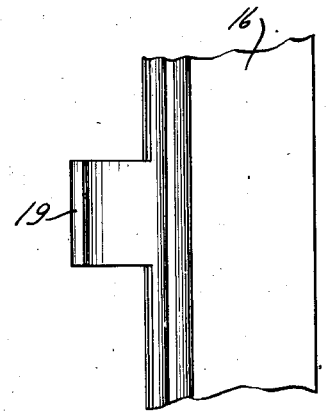
Inventor
GEORGE ALBERT LYON
by The Firm of Charles W. Hills
Attys.

Patented Dec. 2, 1947

2,431,701

UNITED STATES PATENT OFFICE 2,431,701

TRIM RING FOR VEHICLE WHEELS

George Albert Lyon, Allenhurst, N. J.

Application April 3, 1946, Serial No. 659,355

5 Claims. (Cl. 301—37)

This invention relates to a wheel cover, and more particularly to improved retaining means for a wheel cover of the same general type as that disclosed in my Patent No. 2,368,254, and more particularly Figure 17 thereof.

An object of this invention is to provide an improved and simple form of retaining means for a plastic wheel cover.

Another object of this invention is to provide a composite metal and plastic wheel cover wherein the main covering portion is made of plastic and the retaining means is made of sheet metal.

Still another object of this invention is to provide a simple but unique way of interconnecting an annular cover with a cover retaining means so that the cover retaining means not only serves to hold the cover on the wheel, but in addition, reinforces a margin of the cover.

In accordance with the general features of this invention, there is provided in a cover structure for a wheel, including a multi-flanged tire rim part and a load bearing or body part connected thereto at spaced intervals leaving spaced wheel openings, a wheel cover including an annular portion for disposition over exposed side flanges of the rim part and having its radially inner margin provided with spaced tabs turned back upon the inner margin and a cover retaining ring including an annular part with a turned edge nestingly engaged with the tabs and provided with spaced resilient fingers projecting in the wheel openings and engaged with at least one of the wheel parts to hold the ring and cover portion on the wheel.

Another feature of the invention relates to making the cover portion of plastic and the retaining ring of metal so that the retaining means can assist in reinforcing and backing up the cover portion.

Other objects and features of this invention will more fully appear from the following detailed description taken in connection with the accompanying drawings which illustrate a single embodiment thereof and in which Figure 1 is a side view of a cover wheel assembly embracing the features of this invention, showing a portion of the cover broken away to illustrate the body part and retaining ring therebehind;

Figure 2 is an enlarged fragmentary cross sectional view taken on substantially the line II—II of Figure 1 looking in the direction indicated by the arrows; and Figure 3 is a fragmentary detail view taken from the rear side of the cover portion and showing one of the retaining tabs on the inner edge of the cover portion.

As shown on the drawings:

The reference character 9 designates generally a conventional pneumatic tire and tube assembly mounted in the usual way upon a multi-flanged drop center type of tire rim 10, which is well known in the automotive field. This tire rim is attached at spaced intervals to a load bearing or body part 11, leaving spaced axial wheel openings 12 for the circulation of air through the wheel.

The central portion of the body part 11 is dished or recessed so as to provide a bolt-on flange 13 adapted to be attached in the usual way by means of bolts or cap screws (not shown) to a part on an automobile axle.

In addition, the flange 13 has projecting therefrom a plurality of circumferentially spaced inverted spring clips 14 for detachably retaining a hub cap 15 over the center of the wheel. This structure is likewise conventional and is not a part of this invention.

Cooperable with an exposed outer side of the wheel is a wheel cover 16, embracing the features of this invention, and which comprises an annulus including an outer turned edge 17 adapted to overhang and bear against an outer edge of the tire rim part 10. This cover 16 extends radially and axially inwardly from the turned edge 17 to a point directly over the body part 11, where its inner margin is turned rearwardly and provided with a plurality of spaced curved tabs 19 adapted to bear on the body part. The cover portion is of a curved convex cross-sectional contour, and is of such radial depth that in use it simulates a side wall of the tire, so as to give the illusion of the tire being much larger than is in reality the case. This appearance can be accentuated by providing the cover with a white external finish, in which event it will constitute a white side wall part of the tire; or, in other words, will cause the tire to appear to be like a so-called white side wall tire.

This feature, however, has already been previously covered in my earlier Letters Patent and is alluded to in the previously noted patent.

Cooperable with the tabs 19 of the cover 16 is a retaining ring 20, which is preferably made of sheet steel. This ring may be very economically rolled from sheet steel. The rolled section is cut to the proper length and the ends are welded together so as to form a continuous ring.

As distinguished from the ring 20, the cover portion 16 is preferably made of a resiliently pliable or yieldable material, which is self-sustaining as to form and yet resiliently deflectable without permanent deformation. Excellent results may be obtained by making this cover of a synthetic plastic, such, for example, as ethyl cellulose, cellulose acetate, or a vinyl resin. While this cover portion may, with advantage, be made from synthetic plastic, it is of course clear that as far as the features of this invention are concerned, it could also be made of sheet metal. That is to say, the retaining ring 20 would still function to hold the cover on the wheel irrespective of whether it is made of plastic or metal. However, if it is made of plastic, then the ring serves the additional function of reinforcing and backing up an inner margin of the cover where it is in engagement with the retaining means and where it is adapted to be bottomed on the body part of the wheel.

The annular cover retaining ring 20 extends radially inwardly and is formed into a rolled or turned edge 21 nested inside of the tabs 19; that is to say, the tabs 19 are snapped over the turned edge 21 so that the cover 16 is held on the ring.

Furthermore, the cover ring 20 is provided with a plurality of axially rearwardly projecting gooseneck-shaped retaining fingers 22, each of which has an inclined extremity formed for biting engagement with a base flange of the rim part of the wheel inside of a wheel opening. The angle of each of the fingers 23 is such that the finger can be easily pushed into the wheel opening but is more difficult to remove since any tendency to pull the finger out of the wheel opening enhances its gripping engagement. However, the finger can be easily released from its gripping engagement by pressure thereon from its rear side. This can be effected by inserting a screw driver from the rear of the wheel into the opening and pushing the finger 23 outwardly out of biting engagement with the rim part.

It will be perceived from Figure 2 that through a finger portion of the ring, the ring has substantially an S-shaped cross-sectional contour in which the finger constitutes one leg of the S and the main portion of the ring including the turned edge 21 constitutes another leg.

In practice, the cover is first snapped over the turned edge 21. This is effected by positioning the tabs 19 opposite the turned edge 21 and then gradually pressing the cover over the edge until its curved inner margin 18 is tightly nested around the turned edge 21. Thereafter the cover is positioned over the wheel with the valve stem 8 (Fig. 1) projecting through a suitable opening in the cover. When in this position the fingers 22 are aligned with the wheel openings and then the cover is pressed axially inwardly so as to force the fingers into the openings and into wedged engagement with the wheel between the wheel parts.

Attention is also directed to the fact that the fingers 22 can be easily aligned with the wheel openings by slipping the ring circumferentially through the tabs 19. In other words, the turned edge 21 of the ring can be moved around the tabs to properly locate the fingers.

In shipping the covers, they can be nested one within the other since the rings 20 do not have to be attached to the cover for shipment. The rings can be shipped separately from the covers. This simplifies materially the packaging problem and minimizes the likelihood of damage to the plastic rings in shipment since when they are nested one within the other, they present a relatively solid mass.

Access may be had to the valve stem 8 in the event that it does not project beyond the cover 16 by merely flexing the outer margin 17 of the cover away from the wheel. This will enable the operator to insert a hose nozzle or the like behind the cover for the purpose of attachment to the valve stem.

I claim as my invention:

1. In a cover structure for a wheel including a multi-flanged tire rim part and a load bearing body part connected thereto at spaced intervals leaving spaced wheel openings, a wheel cover including an annular portion for disposition over exposed side flanges of the rim part and having its radially inner margin provided with spaced tabs turned back upon the inner margin, and a cover retaining ring including an annular part with a turned edge nestingly engaged with said tabs and provided with spaced resilient fingers projecting axially rearwardly in said wheel openings and engaged with at least one of said wheel parts to hold the ring and cover portion on the wheel.

2. In a cover structure for a wheel including a multi-flanged tire rim part and a load bearing body part connected thereto at spaced intervals leaving spaced wheel openings, a wheel cover including an annular portion for disposition over exposed side flanges of the rim part and having its radially inner margin provided with spaced tabs turned back upon the inner margin and a cover retaining ring including an annular part with a turned edge nestingly engaged with said tabs and provided with spaced resilient fingers projecting axially rearwardly in said wheel openings and engaged with at least one of said wheel parts to hold the ring and cover portion on the wheel, said cover portion being made of resiliently pliable synthetic plastic material and said ring being made of more rigid material, such as steel, and clamping the tabs of said cover portion tightly against the body part of the wheel, with the outer edge of the cover portion in contact with an edge of the rim part.

3. In a cover structure for a wheel including a multi-flanged tire rim part and a load bearing body part connected thereto at spaced intervals leaving spaced wheel openings, a wheel cover including an annular portion for disposition over exposed side flanges of the rim part and having its radially inner margin provided with spaced tabs turned back upon the inner margin, and a cover retaining ring including an annular part with a turned edge nestingly engaged with said tabs and provided with spaced resilient fingers projecting axially rearwardly in said wheel openings and engaged with at least one of said wheel parts to hold the ring and cover portion on the wheel, each of said fingers including a goose-neck portion with an inclined finger for biting engagement with a surface of one of said wheel parts inside of a wheel opening.

4. In a cover structure for a wheel including a multi-flanged tire rim part and a load bearing body part connected thereto at spaced intervals leaving spaced wheel openings, a wheel cover including an annular portion for disposition over exposed side flanges of the rim part and having its radially inner margin provided with spaced tabs turned back upon the inner margin, and a cover retaining ring including an annular part with a turned edge nestingly engaged with said tabs and provided with spaced resilient fingers projecting axially rearwardly in said wheel openings and engaged with at least one of said wheel parts to hold the ring and cover portion on the wheel, said cover portion being made of resiliently pliable material which is readily deflectable without permanent deformation, and which upon release will spring back to its original contour, the tabs of said cover portion being firmly clamped to the body part by the retaining ring so that the outer part of the cover portion is deflectable relative to the bearing of said tabs on the body part.

5. In a cover structure for a wheel including a multi-flanged tire rim part and a load bearing body part connected thereto at spaced intervals leaving spaced wheel openings, a wheel cover including an annular portion for disposition over exposed side flanges of the rim part and having its radially inner margin provided with spaced tabs turned back upon the inner margin, and a cover retaining ring including an annular part with a turned edge nestingly engaged with said tabs and provided with spaced resilient fingers projecting axially rearwardly in said wheel openings and engaged with at least one of said wheel parts to hold the ring and cover portion on the wheel, said retaining ring through each of its fingers having substantially an S-shaped cross-sectional contour with one leg of the S engaged within the wheel opening and the other leg being formed into the turned edge in engagement with the inner margin of the cover portion.

GEORGE ALBERT LYON.